(12) United States Patent
Salkintzis et al.

(10) Patent No.: US 12,452,338 B2
(45) Date of Patent: Oct. 21, 2025

(54) REQUESTING DATA CONNECTION FOR UAV OPERATION

(71) Applicant: Lenovo (Singapore) PTE. LTD., New Tech Park, Singapore (SG)

(72) Inventors: Apostolis Salkintzis, Athens (GR); Genadi Velev, Darmstadt (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 74 days.

(21) Appl. No.: 17/600,947

(22) PCT Filed: Apr. 1, 2019

(86) PCT No.: PCT/EP2019/058136
§ 371 (c)(1),
(2) Date: Apr. 13, 2022

(87) PCT Pub. No.: WO2020/200410
PCT Pub. Date: Oct. 8, 2020

(65) Prior Publication Data
US 2025/0047750 A1 Feb. 6, 2025

(51) Int. Cl.
*H04L 67/141* (2022.01)
*H04L 67/125* (2022.01)
(Continued)

(52) U.S. Cl.
CPC .......... *H04L 67/141* (2013.01); *H04L 67/125* (2013.01); *H04L 67/52* (2022.05); *H04W 12/08* (2013.01)

(58) Field of Classification Search
CPC ..... H04L 67/141; H04L 67/52; H04L 67/125; H04W 12/08
(Continued)

(56) References Cited

U.S. PATENT DOCUMENTS

| | | | |
|---|---|---|---|
| 2021/0329460 A1* | 10/2021 | Liao | H04W 12/37 |
| 2021/0345117 A1* | 11/2021 | Zhang | H04W 12/63 |
| 2022/0086741 A1* | 3/2022 | Liao | G08G 5/26 |

FOREIGN PATENT DOCUMENTS

| | | |
|---|---|---|
| WO | 2018144761 A1 | 8/2018 |
| WO | 2019028909 A1 | 2/2019 |

OTHER PUBLICATIONS

I. Bor-Yaliniz et al., "Is 5G Ready for Drones: a Look Into Contemporary and Prosepctive Wireless Networks From a Standardized Perspective", Technical Report of Wireless Networking Group, Coordinated Science Laboratory; Dept. Electrical and Computer Engineering; University of Illinois at Urbana—Champaign, vol. 26, No. 1, Feb. 1, 2019 , pp. 1-11.

(Continued)

*Primary Examiner* — Nicholas R Taylor
*Assistant Examiner* — Chong G Kim
(74) *Attorney, Agent, or Firm* — Kunzler Bean & Adamson

(57) ABSTRACT

Apparatuses, methods, and systems are disclosed for establishing a data connection for UAV operation. One apparatus includes a processor and a transceiver that communicates with a mobile communication network via an access network. Here, the processor sends (e.g., via the transceiver) a data connection request to a session management function, the data connection request requesting unmanned aerial vehicle ("UAV") operation. The processor receives (e.g., via the transceiver) a response to the data connection request. Here, the response includes remote identification and tracking information ("RITI") for the UAV operation. The processor further sends (e.g., via the transceiver) one or more UAV data reports to a UAV Traffic Management ("UTM") function using the RITI.

20 Claims, 10 Drawing Sheets

(51) Int. Cl.
   *H04L 67/52*   (2022.01)
   *H04W 12/08*   (2021.01)
(58) Field of Classification Search
   USPC .......................................................... 370/316
   See application file for complete search history.

(56) References Cited

OTHER PUBLICATIONS

PCT/EP2019/058136, International Search Report, PCT, Oct. 21, 2019, pp. 1-4.

PCT/EP2019/058136, "Written Opinion of the International Searching Authority", PCT, Oct. 21, 2019, pp. 1-9.

3GPP, "3rd Generation Partnership Project; Technical Specification Group Services and System Aspects; Procedures for the 5G System; Stage 2 (Release 16)", 3GPP TS 23.502 V16.1.1, Jun. 2019, pp. 1-495.

3GPP, "3rd Generation Partnership Project; Technical Specification Group Services and System Aspects; Remote Identification of Unmanned Aerial Systems; Stage 1 (Release 16)", 3GPP TR 22.825 V16.0.0, Sep. 2018, pp. 1-22.

3GPP, "3rd Generation Partnership Project; Technical Specification Group Services and System Aspects; Unmanned Aerial System (UAS) support in 3GPP; Stage 1; Release 16", 3GPP TS 22.125 V16.3.0, Sep. 2019, pp. 1-10.

* cited by examiner

REQUESTING DATA CONNECTION FOR UAV OPERATION

FIELD

The subject matter disclosed herein relates generally to wireless communications and more particularly relates to establishing a data connection for UAV operation.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Network Performance ("ANP"), Access Point Name ("APN"), Access Stratum ("AS"), Access Traffic Steering, Switching and Splitting ("ATSSS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Differentiated Services Code Point ("DSCP"), Downlink Control Information ("DCI"), Downlink ("DL"), Enhanced Clear Channel Assessment ("eCCA"), Enhanced Mobile Broadband ("eMBB"), Encapsulating Security Payload ("ESP"), Evolved Node-B ("eNB"), Evolved Packet Core ("EPC"), Evolved UMTS Terrestrial Radio Access Network ("E-UTRAN"), European Telecommunications Standards Institute ("ETSI"), Fixed Access Gateway Function ("FAGF"), Fixed Network Residential Gateway ("FN-RG"), Frame Based Equipment ("FBE"), Frequency Division Duplex ("FDD"), Frequency Division Multiple Access ("FDMA"), Generic Routing Encapsulation ("GRE"), Globally Unique Temporary UE Identity ("GUTI"), Hybrid Automatic Repeat Request ("HARQ"), Home Subscriber Server ("HSS"), Internet-of-Things ("IoT"), IP Multimedia Subsystem ("IMS," aka "IP Multimedia Core Network Subsystem"), Internet Protocol ("IP"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), Quadrature Phase Shift Keying ("QPSK"), Registration Area ("RA"), Radio Access Network ("RAN"), Radio Access Technology ("RAT"), Remote Identification and Tracking Information ("RITI"), Radio Resource Control ("RRC"), Receive ("RX"), Single Network Slice Selection Assistance Information ("S-NSSAI"), Scheduling Request ("SR"), Secure User Plane Location ("SUPL"), Serving Gateway ("SGW"), Session Management Function ("SMF"), Stream Control Transmission Protocol ("SCTP"), System Information Block ("SIB"), Tracking Area ("TA"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Trusted WLAN Interworking Function ("TWIF"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), User Datagram Protocol ("UDP"), UE Route Selection Policy ("URSP"), Unmanned Aerial Vehicle ("UAV"), UAV Traffic Management ("UTM"), Wireless Local Area Network ("WLAN"), Wireless Local Area Network Selection Policy ("WLANSP"), and Worldwide Interoperability for Microwave Access ("WiMAX").

An Unmanned Aerial Vehicular ("UAV"), commonly known also as "drone," may operate under the control of an UAV operator using a UAV controller. In some implementations, direct radio connection in required between the UAV and the UAV controller. In certain implementations, the operating range of the UAV may be extended by use of an intermediary network, such as a 3GPP-compliant wireless communication network.

BRIEF SUMMARY

Methods for establishing a data connection for UAV operation are disclosed. Apparatuses and systems also perform the functions of the methods.

A first method for establishing a data connection for UAV operation includes receiving a first session management request via an access management function. Here, the first session management request containing a second session management request sent by a remote unit that communicates with a mobile communication network, the second session management request requesting UAV operation. The first method includes obtaining subscription data for the remote unit including a UAV identity. The first method includes selecting a UTM function in response to receiving the second session management request. The first method includes sending a first request to the selected UTM function to authorize the UAV operation for the UAV identity. The first method includes receiving a response to the first request including RITI for the UAV operation. The first method includes sending a response to the second session management request via the access management function, the response including the remote identification and tracking information.

A second method for establishing a data connection for UAV operation includes receiving a first request from a session management function to authorize UAV operation, the first request containing a UAV identity. The second method includes retrieving, from a datastore, one or more valid flight authorizations associated with the UAV identity. The second method includes determining whether the UAV operation is authorized based on the one or more valid flight authorizations. The second method includes sending a response to the first request, the response including RITI for the UAV operation, in response to determining that the UAV operation is authorized.

A third method for establishing a data connection for UAV operation includes sending a data connection request to a session management function, the data connection request requesting UAV operation. The third method includes receiving a response to the data connection request, the response including RITI for the UAV operation. The third method includes sending one or more UAV data reports to a UTM function using the RITI.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
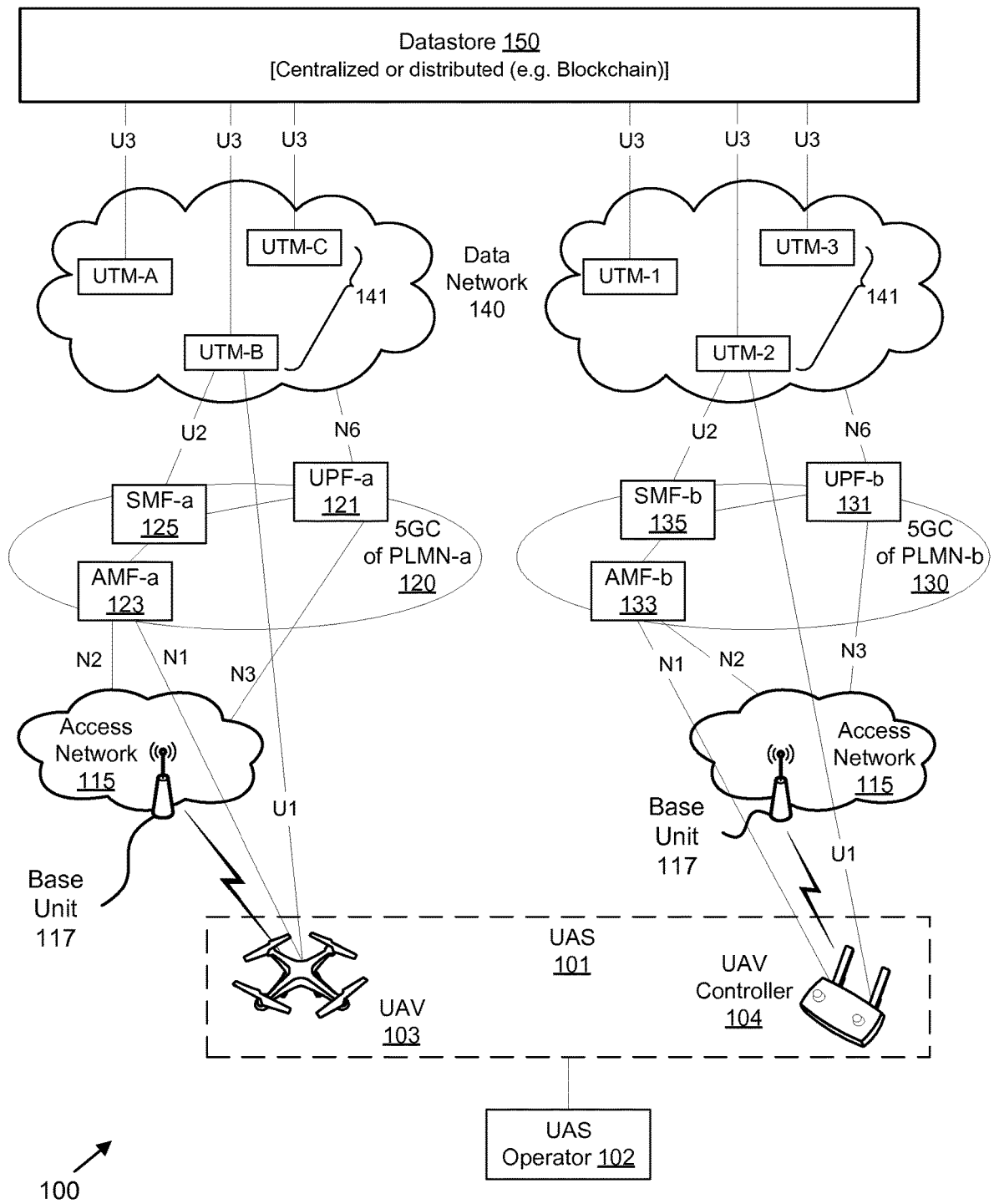
FIG. 1 is a schematic block diagram illustrating one embodiment of a wireless communication system for establishing a data connection for UAV operation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for establishing a data connection for UAV operation. Currently there are no defined procedures for enabling authorized Unmanned Aerial Systems to operate via a 5G mobile communication network. Disclosed herein are extensions to the 5G system architecture and procedures that enable UAVs and UAV Controllers to establish 5G data sessions (aka "PDU Sessions") for UAV operation.

FIG. 1 depicts a wireless communication system 100 for establishing a data connection for UAV operation, according to embodiments of the disclosure. In one embodiment, the wireless communication system 100 includes at least one access network 115 and at least one mobile core network. As depicted, the wireless communication system 100 may include a first PLMN ("PLMN-a") and a second PLMN ("PLMN-b"). Here, the wireless communication system 100 includes at least a first core network 120 belonging to the PLMN-a and a second core network 130 belonging to the PLMN-b. The access network 115 and the mobile core networks form a mobile communication network.

An Unmanned Aerial System ("UAS") 101 includes an Unmanned Aerial Vehicular ("UAV") 103, e.g., a "drone," and an UAV Controller 104. The UAS Operator 102 is the person who operates the UAV 103 (e.g., via the UAV Controller 104) and who, typically, requests for flight authorizations. The UAV 103 and UAV controller 104 may each be UEs in the wireless communication system 100. As such, the UAV 103 may communication with an access network 115 to access services provided by a mobile core network (e.g., first core network 120 and/or second core network 130).

Even though a specific number of UAVs 103, UAV controller 104, access networks 115, and mobile core networks 120, 130 are depicted in FIG. 1, one of skill in the art will recognize that any number of UAVs 103, UAV controller 104, access networks 115, and mobile core networks 120, 130 may be included in the wireless communication system 100.

Each access networks 115 contains at least one base unit 117 and may be composed of a 3GPP access network (containing at least one cellular base unit) and/or a non-3GPP access network (containing at least one access point). In various embodiments, an access network 115 is a radio access network, such as a 5G-RAN. A UE (e.g., the UAV 103 and/or UAV controller 104) may communicate with a 3GPP access network using 3GPP communication links and/or communicates with a non-3GPP access network using non-3GPP communication links.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, a UE (e.g., a UAV controller 104) may include computing devices, such as desktop computers, laptop computers, personal digital assistants ("PDAs"), tablet computers, smart phones, smart appliances (e.g., appliances connected to the Internet), game consoles, remote controllers, or the like. Moreover, the UEs may be referred to as, subscriber units, mobiles, mobile stations, users, terminals, mobile terminals, fixed terminals, subscriber stations, user terminals, wireless transmit/receive unit ("WTRU"), a device, or by other terminology used in the art.

The UEs (e.g., the UAV 103 and/or UAV controller 104) may communicate directly with one or more of the base units 117 in the access network 115 via uplink ("UL") and downlink ("DL") communication signals. In some embodiments, the UL and DL communication signals are carried over the 3GPP communication links. In other embodiments, the UL and DL communication signals are carried over the non-3GPP communication links. Here, the access networks 115 are intermediate networks that provide the UAV 103 and/or UAV controller 104 with access to the mobile core networks 120, 130.

In some embodiments, the UEs communicate with one or more UAV Traffic Management ("UTM") functions via a network connection with the mobile core networks 120, 130. As described in further detail below, the UAV 103 may establish a PDU session (or similar data connection) with the mobile core networks 120, 130 using the access network 115. The mobile core networks 120, 130 then relays traffic between the UE and the data network 140 using the PDU session. Note that the UE may establish one or more PDU sessions (or other data connections) with the mobile core networks 120, 130. As such, the UE may have at least one PDU session for communicating with the data network 140.

The UE may establish additional PDU sessions for communicating with other data network and/or other remote hosts.

The base units 117 may be distributed over a geographic region. In certain embodiments, a base unit 117 may also be referred to as an access point, an access terminal, a base, a base station, a Node-B, an eNB, a gNB, a Home Node-B, a relay node, a device, or by any other terminology used in the art. The base units 117 are generally part of a radio access network ("RAN"), such as a 5G-RAN, that may include one or more controllers communicably coupled to one or more corresponding base units 117. These and other elements of radio access network are not illustrated but are well known generally by those having ordinary skill in the art. The base units 117 connect to the mobile core networks 120, 130 via the access network 115.

The base units 117 may serve a number of UEs within a serving area, for example, a cell or a cell sector, via a wireless communication link. The base units 117 may communicate directly with one or more of the UEs via communication signals. Generally, the base units 117 transmit DL communication signals to serve the UEs in the time, frequency, and/or spatial domain. Furthermore, the DL communication signals may be carried over the communication links. The communication links may be any suitable carrier in licensed or unlicensed radio spectrum. The communication links facilitate communication between one or more of the UEs and/or one or more of the base units 117.

In one embodiment, the first mobile core network 120 is a 5G core ("5GC") or the evolved packet core ("EPC"), which may be coupled to a data network (e.g., the data network 140, such as the Internet and private data networks, among other data networks. Similarly, the second mobile core network 130 may be a 5G core ("5GC") or the evolved packet core ("EPC"), which may be coupled to a data network (e.g., the data network 140, such as the Internet and private data networks, among other data networks. A UE may have a subscription or other account with the mobile core networks 120, 130. Each mobile core networks 120, 130 belongs to a single public land mobile network ("PLMN"). The present disclosure is not intended to be limited to the implementation of any particular wireless communication system architecture or protocol.

The mobile core networks 120, 130 includes several network functions ("NFs"). The first mobile core network 120 may include one or multiple user plane functions ("UPFs"). As depicted, the first mobile core network 120 includes at least a first UPF ("UPF-a") 121. The first mobile core network 120 also includes multiple control plane functions including, but not limited to, a first Access and Mobility Management Function ("AMF-a") 123, and a first Session Management Function ("SMF-a") 125. In certain embodiments, the first mobile core network 120 may also include an Authentication Server Function ("AUSF"), a Policy Control Function ("PCF"), and a Unified Data Management function ("UDM"), a Network Repository Function ("NRF") (used by the various NFs to discover and communicate with each other over APIs), or other NFs defined for the 5GC.

Similarly, the second mobile core network 130 may include one or multiple UPFs. As depicted, the second mobile core network 130 includes at least a second UPF ("UPF-b") 131. The second mobile core network 130 also includes multiple control plane functions including, but not limited to, a second AMF ("AMF-b") 133, and a second SMF ("SMF-b") 135. In certain embodiments, the second mobile core network 130 may also include an AUSF, a PCF, and a UDM, a NRF, or other NFs defined for the 5GC.

Although specific numbers and types of network functions are depicted in FIG. 1, one of skill in the art will recognize that any number and type of network functions may be included in the mobile core networks 120, 130. Moreover, where the mobile core networks 120, 130 is an EPC, the depicted network functions may be replaced with appropriate EPC entities, such as an MME, S-GW, P-GW, HSS, and the like. In various embodiments, the mobile core networks 120, 130 supports different types of mobile data connections and different types of network slices, wherein each mobile data connection utilizes a specific network slice. The different network slices are not shown in FIG. 1 for ease of illustration, but their support is assumed.

As depicted, a UE (e.g., the UAV 103 and/or UAV controller 104) may connect to the mobile core network (e.g., to a 5G mobile communication network) via an access network 115. Connecting to the mobile communication network (e.g., a combination of access network and mobile core network) allows the UAV 103 to operate at increased distances from the UAV controller 104 and does not require a line-of-sight connection between the UAV 103 and UAV controller 104.

Generally, the UAS Operator 102 may file a flight plan (e.g., the flight start time, the flight duration, the flight route, mission type, etc.) prior to UAV operation. Moreover, the UAS 101 may interact with one or more UAV traffic management ("UTM") functions 141 when filing flight plans and/or operating the UAV 103. In various embodiments, each mobile core network 120, 130 that supports UAV operation is able to communicate with one or more UTMs 141. A UTM 141 is an element that manages UAV operation for one or multiple UAVs 103 and UAV controller 104. In various embodiments, a UTM 141 monitors UAVs 103 and UAV Controllers 104 operating in a specific uncontrolled airspace (below 400 feet above the ground). Managing UAV operation may include providing flight authorizations, performing collision avoidance, determining alternative flight routes, ensuring that UAV operation remains within authorized limits, etc. In various embodiments, the operation of a UTM is similar to the operation of an Air Traffic Controller (ATC), which manages manned aircrafts on the ground and in controlled airspace (above 400 feet).

As depicted, the UTM(s) 141 are in communication with a datastore 150, which stores flight authorizations. The flight authorizations stored in the datastore are available to all UTMs 141 that can interact with the datastore 150. These UTMs 141 may be accessible via one or more 5G PLMNs (e.g., core networks 120, 130).

The datastore 150 may be a centralized or distributed datastore. In one example, the datastore 150 is realized as a Permissioned or Private Blockchain, which can be accessed only by UTMs 141 with appropriate access credentials. In another example, the datastore 150 is realized as a Permissionless or Public Blockchain, which can be accessed without access credentials. In the latter case, the datastore 150 may include a Smart Contract that facilitates storage and retrieval of flight authorization. In certain embodiments, the Smart Contract is only accessible by a list pre-configured clients (e.g. by all authorized UTMs 141). In yet another example, the datastore 150 is realized as a centralized storage service (e.g., cloud storage), which can be accessed by UTMs 141 possessing the appropriate access credentials.

New reference points (e.g., interfaces) in the system 100 include: U1, U2, and U3. The U1 reference point exists between a UAV 103 or UAV Controller 104 and a UTM 141. The U1 reference point is used after the establishment of a PDU Session for UAV operation in order to provide Remote Identification and Tracking Information ("RITI") to the UTM(s) 141. The RITI is used by UTM(s) 141 to identify a UAV 103 (or UAV controller 104) and track the UAV status, e.g. position, speed, altitude, battery level, etc. The U2 reference point exists between a SMF (e.g., SMF-a 125 and/or SMF-b 135) and a UTM 141. The U2 reference point is used by the SMF when a PDU Session for UAV operation is requested, e.g., to determine if the PDU Session should be accepted or not. Each SMF 125, 135 is able to communicate with one or more UTM(s) 141. For ease of illustration, only one instance of U2 is shown for each SMF 125, 135. The U3 reference point exists between a UTM 141 and a datastore 150, which stores flight authorizations. Procuring flight authorization is discussed in greater detail below, with reference to FIG. 5.

In many scenarios, a UAV controller 104 establishes a connection to a UAV 103 via one or more 5G systems. For example, the UAV controller 104 may establish a data connection to the UAV 103 via the access network 115 and the first and/or second core networks 120, 130. When the UE (e.g., one of the UAV 103 and UAV controller 104) requests to establish a data connection (e.g., a PDU session) for UAV operation, an SMF in the core network(s) (e.g., the SMF 125 and/or SMF 135) selects a UTM 141 and verifies the UAV operation. The UTM 141 provides UAV flight authorization information as well as RITI to the SMF. Data session establishment for UAV operation is discussed in greater detail below, with reference to FIGS. 6A-6B.

Figure 2:
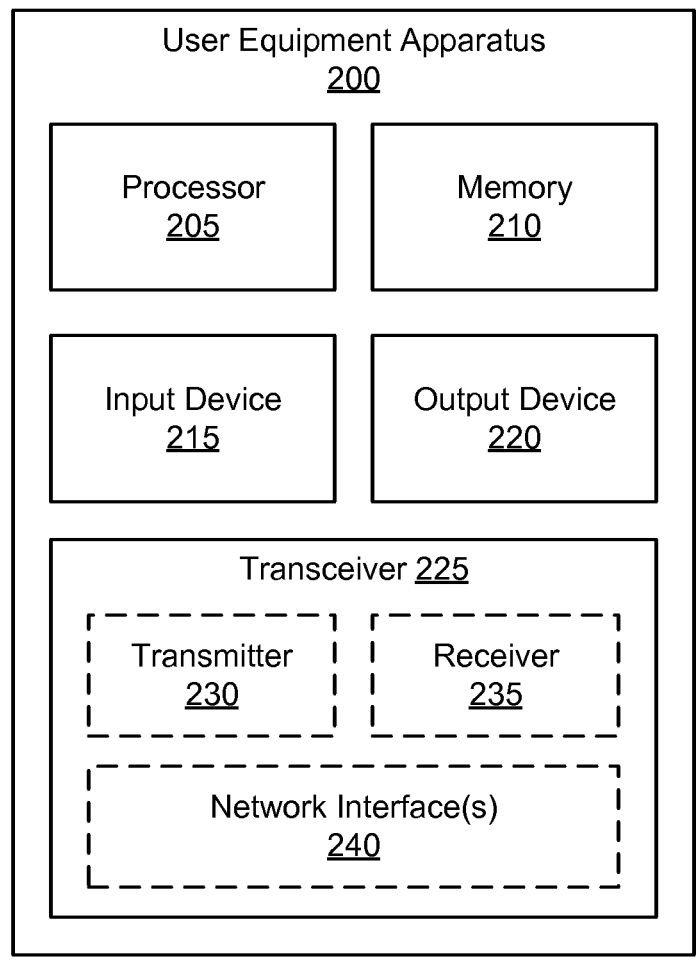
FIG. 2 is a block diagram illustrating one embodiment of a user equipment apparatus for establishing a data connection for UAV operation.

FIG. 2 depicts one embodiment of a user equipment apparatus 200 that may be used for establishing a data connection for UAV operation, according to embodiments of the disclosure. In some embodiments, the user equipment apparatus 200 is one embodiment of the UAV 103. In some embodiments, the user equipment apparatus 200 is one embodiment of the UAV controller 104. Furthermore, the user equipment apparatus 200 may include a processor 205, a memory 210, an input device 215, an output device 220, a transceiver 225. In some embodiments, the input device 215 and the output device 220 are combined into a single device, such as a touch screen. In certain embodiments, the user equipment apparatus 200 does not include any input device 215 and/or output device 220.

As depicted, the transceiver 225 includes at least one transmitter 230 and at least one receiver 235. Here, the transceiver 225 communicates with one or more access networks. Additionally, the transceiver 225 may support at least one network interface 240. Here, the at least one network interface 240 facilitates communication with an eNB or gNB (e.g., using the "Uu" interface). Additionally, the at least one network interface 240 may include an interface used for communications with an UPF, an AMF, and/or a UTM.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the output device 220, and the transceiver 225.

In various embodiments, the processor 205 sends (e.g., via the transceiver 225) a data connection request to a session management function, the data connection request requesting UAV operation. The processor 205 receives (e.g., via the transceiver 225) a response to the data connection request. Here, the response includes remote identification and tracking information ("RITI") for the UAV operation. The processor 205 further sends (e.g., via the transceiver 225) one or more UAV data reports to a UTM function using the RITI.

In some embodiments, the RITI includes reporting frequency information, wherein the one or more UAV data reports are sent according to the reporting frequency information. In some embodiments, the RITI comprises an authorization token, wherein the authorization token comprises a value that identifies the apparatus to a UTM function and associates the apparatus with a valid flight authorization. In some embodiments, the RITI comprises a data destination, which comprises one of: a uniform resource locator, a multicast network address, and a unicast network address of the apparatus.

In some embodiments, the RITI includes an authorization token. In such embodiments, the transceiver 225 further sends a UAV session request containing the authorization token to the UTM function. Here, sending the one or more UAV data reports occurs in response to establishing the UAV session with the UTM function.

In some embodiments, the RITI includes an authorization token, wherein the one or more UAV data reports include the authorization token. In some embodiments, the response to the data connection request includes reporting frequency information, wherein the one or more UAV data reports are sent according to the reporting frequency information.

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media. In some embodiments, the memory 210 stores data relating to establishing a data connection for UAV operation, for example storing RITI, and the like. In certain embodiments, the memory 210 also stores program code and related data, such as an operating system ("OS") or other controller algorithms operating on the user equipment apparatus 200 and one or more software applications.

The input device 215, in one embodiment, may include any known computer input device including a touch panel, a button, a keyboard, a stylus, a microphone, or the like. In some embodiments, the input device 215 may be integrated with the output device 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The output device 220, in one embodiment, may include any known electronically controllable display or display device. The output device 220 may be designed to output visual, audible, and/or haptic signals. In some embodiments, the output device 220 includes an electronic display capable of outputting visual data to a user. For example, the output device 220 may include, but is not limited to, an LCD display, an LED display, an OLED display, a projector, or similar display device capable of outputting images, text, or the like to a user. As another, non-limiting, example, the output device 220 may include a wearable display such as a smart watch, smart glasses, a heads-up display, or the like. Further, the output device 220 may be a component of a smart phone, a personal digital assistant, a television, a table computer, a notebook (laptop) computer, a personal computer, a vehicle dashboard, or the like.

In certain embodiments, the output device 220 includes one or more speakers for producing sound. For example, the output device 220 may produce an audible alert or notification (e.g., a beep or chime). In some embodiments, the output device 220 includes one or more haptic devices for producing vibrations, motion, or other haptic feedback. In some embodiments, all or portions of the output device 220 may be integrated with the input device 215. For example, the input device 215 and output device 220 may form a touchscreen or similar touch-sensitive display. In other embodiments, all or portions of the output device 220 may be located near the input device 215.

As discussed above, the transceiver 225 communicates with one or more network functions of a mobile communication network via one or more access networks. The transceiver 225 operates under the control of the processor 205 to transmit messages, data, and other signals and also to receive messages, data, and other signals. For example, the processor 205 may selectively activate the transceiver (or portions thereof) at particular times in order to send and receive messages. The transceiver 225 may include one or more transmitters 230 and one or more receivers 235. In certain embodiments, the one or more transmitters 230 and/or the one or more receivers 235 may share transceiver hardware and/or circuitry. For example, the one or more transmitters 230 and/or the one or more receivers 235 may share antenna(s), antenna tuner(s), amplifier(s), filter(s), oscillator(s), mixer(s), modulator/demodulator(s), power supply, and the like.

In various embodiments, the transceiver 225 is configured to communication with 3GPP access network(s) and non-3GPP access network(s). In some embodiments, the transceiver 225 implements modem functionality for the 3GPP access network(s) and/or the non-3GPP access network(s). In one embodiment, the transceiver 225 implements multiple logical transceivers using different communication protocols or protocol stacks, while using common physical hardware. For example, the transceiver 225 may include one application-specific integrated circuit ("ASIC") which includes the function of first transceiver and second transceiver for accessing different networks. In other embodiments, the transceiver 225 comprises separate transceivers for the 3GPP access network(s) and for the non-3GPP access network(s).

Figure 3:
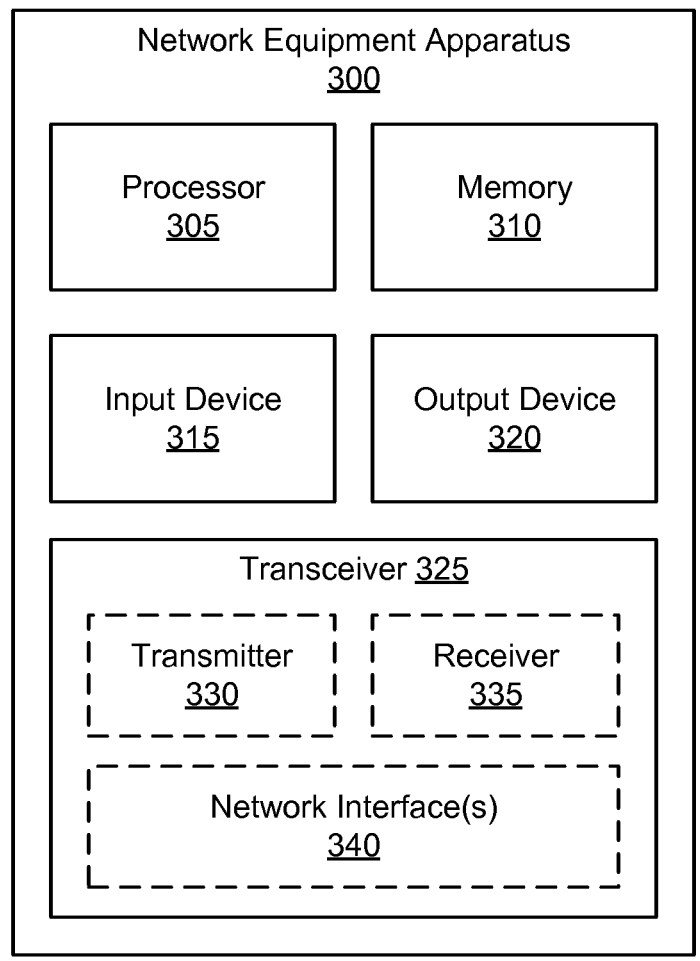
FIG. 3 is a block diagram illustrating one embodiment of a network equipment apparatus for establishing a data connection for UAV operation.

FIG. 3 depicts one embodiment of a network equipment apparatus 300 that may be used for establishing a data connection for UAV operation, according to embodiments of the disclosure. The network equipment apparatus 300 may be one embodiment of an SMF, such as the SMF 125 and/or SMF 135. Furthermore, network equipment apparatus 300 may include a processor 305, a memory 310, an input device 315, an output device 320, a transceiver 325. In some embodiments, the input device 315 and the output device 320 are combined into a single device, such as a touch screen. In certain embodiments, the network equipment apparatus 300 does not include any input device 315 and/or output device 320.

As depicted, the transceiver 325 includes at least one transmitter 330 and at least one receiver 335. Here, the transceiver 325 communicates with one or more UEs (e.g., UAV 103 and/or UAV controller 104), with one or more UTMs 141, and with one or more network functions in a mobile core network. Additionally, the transceiver 325 may support at least one network interface 340.

The processor 305, in one embodiment, may include any known controller capable of executing computer-readable instructions and/or capable of performing logical operations. For example, the processor 305 may be a microcontroller, a microprocessor, a CPU, a GPU, an auxiliary processing unit, a FPGA, or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 receives (e.g., via the transceiver 325) a first session management request via an access management function. Here, the first session management request contains a second session management request sent by a remote unit (e.g., a UE, such as the UAV 103 and/or UAV controller 104) that communicates with the mobile communication network, the second session management request requesting UAV operation. The processor 305 obtains subscription data for the remote unit including a UAV identity. In response to receiving the second session management request, the processor 305 selects a UTM function. The processor 305 sends (e.g., via the transceiver 325) a first request to the selected UTM function to authorize the UAV operation for the UAV identity and receives (e.g., via the transceiver 325) a response to the first request including RITI for the UAV operation. The processor 305 sends (e.g., via the transceiver 325) a response to the second session management request via the access management function, the response including the remote identification and tracking information.

In some embodiments, the first session management request includes a location of the remote unit (e.g., the UAV 103 and/or UAV controller 104). In such embodiments, selecting the UTM function is based on one of: the location of the remote unit and the subscription data for the remote unit. In further embodiments, the first request may include the UAV identity and UAV position information derived from the location of the remote unit.

Note that the location of the remote unit in the first session management request is mobile-network specific, i.e. 'cell id+tracking area id.' This type of location may not be useful to the UTM function, which may be an element outside the mobile network. In certain embodiments, the processor 305 maps the mobile-network specific location ('cell id+tracking area id') to a different type of location, e.g., expressed with GPS coordinates. In other embodiments, the location is not sent to the UTM.

In some embodiments, the response to the first request includes authorization data. Here, the authorization data comprising an authorized flight area. In various embodiments, the processor 305 monitors the UAV operation for compliance with the authorization data.

In some embodiments, the RITI comprises an authorization token, wherein the authorization token comprises a value that identifies the remote unit and associates the remote unit with a valid flight authorization. In some embodiments, the RITI comprises a data destination, which comprises one of: a uniform resource locator, a multicast network address, and a unicast network address. In some embodiments of the first apparatus, the RITI comprises a UAV data reporting frequency. Here, the UAV data reporting frequency indicates an interval at which the remote unit is to send a UAV data report.

The memory 310, in one embodiment, is a computer readable storage medium. In some embodiments, the memory 310 includes volatile computer storage media. For example, the memory 310 may include a RAM, including DRAM, SDRAM, and/or SRAM. In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to establishing a data connection for UAV operation, for example storing RITI, and the like. In certain embodiments, the memory 310 also stores program code and related data, such as an OS or other controller algorithms operating on the network equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

As discussed above, the transceiver 325 may communicate with one or more UEs and with one or more networking functions in a PLMN. The transceiver 325 may also communicate with one or more network functions (e.g., in the mobile core networks 120, 130). The transceiver 325 operates under the control of the processor 305 to transmit messages, data, and other signals and also to receive messages, data, and other signals. For example, the processor 305 may selectively activate the transceiver 325 (or portions thereof) at particular times in order to send and receive messages.

The transceiver 325 may include one or more transmitters 330 and one or more receivers 335. In certain embodiments, the one or more transmitters 330 and/or the one or more receivers 335 may share transceiver hardware and/or circuitry. For example, the one or more transmitters 330 and/or the one or more receivers 335 may share antenna(s), antenna tuner(s), amplifier(s), filter(s), oscillator(s), mixer(s), modulator/demodulator(s), power supply, and the like. In one embodiment, the transceiver 325 implements multiple logical transceivers using different communication protocols or protocol stacks, while using common physical hardware.

Figure 4:
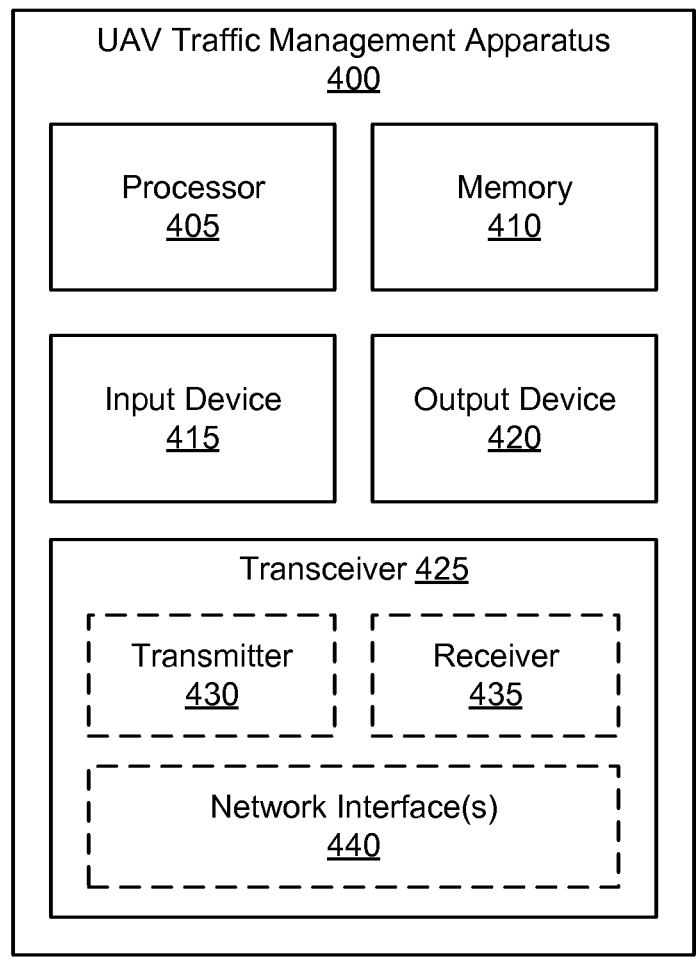
FIG. 4 is a block diagram illustrating one embodiment of a traffic management apparatus for establishing a data connection for UAV operation.

FIG. 4 depicts one embodiment of a traffic management apparatus 400 that may be used for establishing a data connection for UAV operation, according to embodiments of the disclosure. The traffic management apparatus 400 may be one embodiment of the UTM 141. Furthermore, the traffic management apparatus 400 may include a processor 405, a memory 410, an input device 415, an output device 420, a transceiver 425. In some embodiments, the input device 415 and the output device 420 are combined into a single device, such as a touch screen. In certain embodiments, the traffic management apparatus 400 does not include any input device 415 and/or output device 420.

As depicted, the transceiver 425 includes at least one transmitter 430 and at least one receiver 435. Here, the transceiver 425 communicates with one or more UEs (e.g., UAV 103 and/or UAV controller 104) and with one or more network functions in a PLMN (.g. SMF-a 125 and/or SMF-b 135). Additionally, the transceiver 425 may support at least one network interface 440, e.g., supporting communication with a SMF using the U2 reference point and/or a UE via the U1 reference point.

The processor 405, in one embodiment, may include any known controller capable of executing computer-readable instructions and/or capable of performing logical operations. For example, the processor 405 may be a microcontroller, a microprocessor, a CPU, a GPU, an auxiliary processing unit, a FPGA, or similar programmable controller. In some embodiments, the processor 405 executes instructions stored in the memory 410 to perform the methods and routines described herein. The processor 405 is communicatively coupled to the memory 410, the input device 415, the output device 420, and the transceiver.

In various embodiments, the processor 405 receives (e.g., via the transceiver 425) a first request from a session management function to UAV operation. Here, the first request contains a UAV identity (e.g., ID of the UAV 103 and/or UAV controller 104). The processor 405 retrieves, from a datastore 150, one or more valid flight authorizations associated with the UAV identity. The processor 405 determines whether the UAV operation is authorized based on the one or more valid flight authorizations. In response to determining that the UAV operation is authorized, the processor 405 sends (e.g., via the transceiver 425) a response to the first request. Here, the response includes RITI for the UAV operation.

In some embodiments, the RITI comprises an authorization token. In various embodiments, the authorization token comprises a value that identifies a remote unit (e.g., a UE such as the UAV 103 and/or UAV controller 104) and associates the remote unit with a valid flight authorization. In some embodiments, the RITI comprises a data destination, which comprises one of: a uniform resource locator, a multicast network address, and a unicast network address of the apparatus.

In some embodiments, the RITI comprises a UAV data reporting frequency. In various embodiments, the UAV data reporting frequency indicates an interval at which the remote unit (e.g., is to send a UAV data report. In some embodiments, the transceiver 425 further receives a UAV session request from the remote unit. Here, the UAV session request containing an authorization token. In such embodiments, the processor 405 may establish the requested UAV session in response to validating the authorization token. The processor 405 may also track the remote unit using the UAV data received via the established UAV session.

In some embodiments of the second apparatus, the transceiver 425 further receives UAV data from the remote unit, the UAV data containing an authorization token. In such embodiments, the processor 405 tracks the remote unit using the received UAV data. In some embodiments of the second apparatus, the datastore comprises a blockchain network. In some embodiments of the second apparatus, the response to the first request includes authorization data comprising an authorized flight area, wherein the session management function monitors the UAV operation for compliance with the authorization data.

The memory 410, in one embodiment, is a computer readable storage medium. In some embodiments, the memory 410 includes volatile computer storage media. For example, the memory 410 may include a RAM, including DRAM, SDRAM, and/or SRAM. In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to establishing a data connection for UAV operation, for example storing RITI, and the like. In certain embodiments, the memory 410 also stores program code and related data, such as an OS or other controller algorithms operating on the traffic management apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 may communicate with one or more UEs and/or with one or more network functions (e.g., in the mobile core networks 120, 130). The transceiver 425 may also communicate with a datastore to store and retrieve flight authorization data. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 may include one or more transmitters 430 and one or more receivers 435. In certain embodiments, the one or more transmitters 430 and/or the one or more receivers 435 may share transceiver hardware and/or circuitry. For example, the one or more transmitters 430 and/or the one or more receivers 435 may share antenna(s), antenna tuner(s), amplifier(s), filter(s), oscillator(s), mixer(s), modulator/demodulator(s), power supply, and the like. In one embodiment, the transceiver 425 implements multiple logical transceivers using different communication protocols or protocol stacks, while using common physical hardware.

Figure 5:
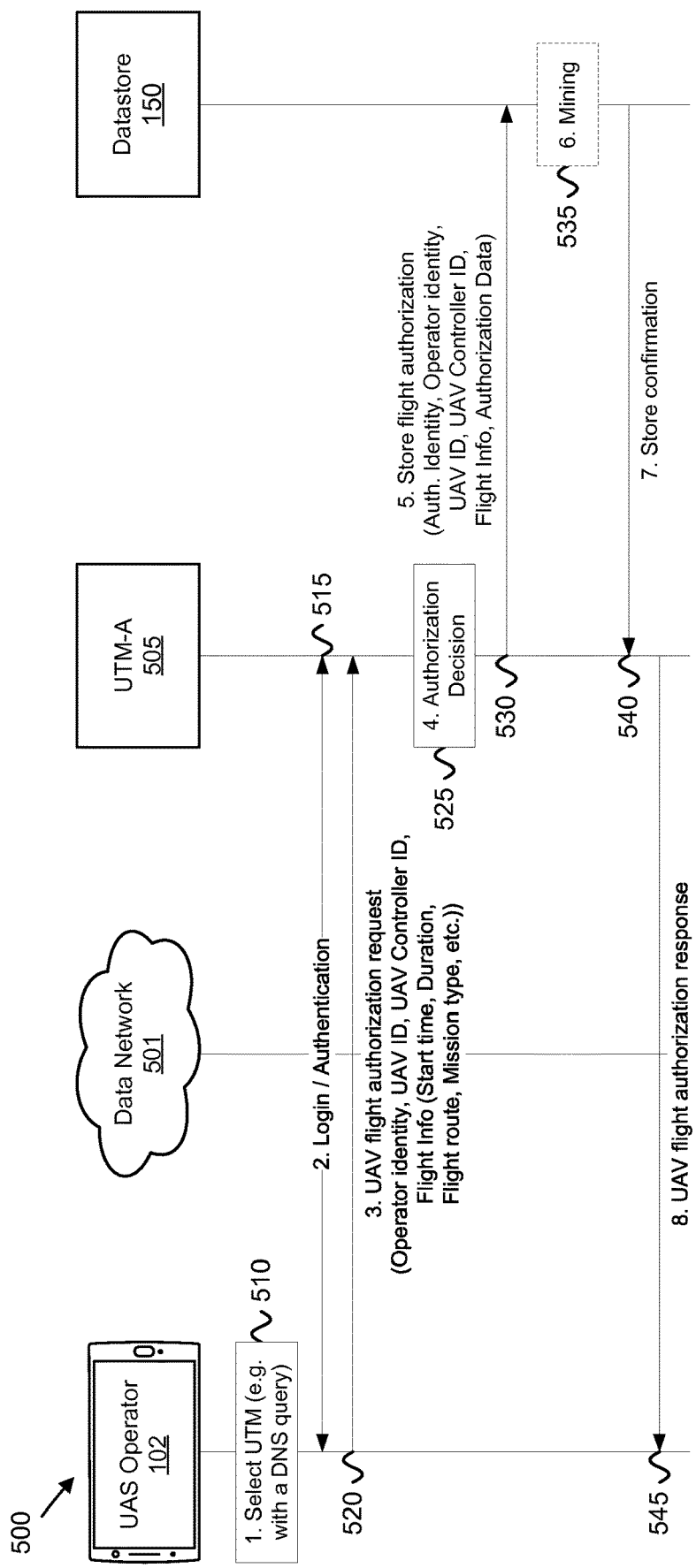
FIG. 5 is a diagram illustrating one embodiment of a procedure for UAV flight authorization.

FIG. 5 depicts a procedure 500 for UAV flight authentication, according to embodiments of the disclosure. The procedure 500 involves a UAS Operator 102 (operating from a terminal) and a first UTM ("UTM-A") 505. The UAS Operator 102 accesses the UTM-A 505 via a data network 501. The data network 501 may be any data network (e.g., IP network). In certain embodiments, the data network 501 is one embodiment of the data network 140. In certain embodiments, the data network 501 comprises a 3GPP PLMN. In other embodiments, the data network 501 does not include a 3GPP PLMN. Note the UTM-A 505 can access the datastore 150. As discussed above, the datastore 150 may be a blockchain network, such as a private blockchain or public blockchain having a smart contract.

In various embodiments, before a UAS operator can fly a UAV, she needs to obtain flight authorization. In certain embodiments, the flight authorization may be obtained by accessing the UTM using a specific application. In other embodiments, the flight authorization may be obtained by accessing the UTM using a specific site or server. The UAS operator launches an application (or accesses the site/server) to request flight authorization.

To request flight operation, the UAS operator 102 may input required flight information, for example, an Operator identity, a UAV identity ("UAV ID"), a UAV Controller identity ("UAV Controller ID"), and the Flight Info. Here, the Flight Info may include a flight start time, a flight duration, a flight route, a mission type, and the like. In various embodiments, the UAS Operator 102 receives the UAV ID from a mobile network operator, after the UAV subscription with this mobile network operator is completed.

In one embodiment, the UAV ID is a mobile telephone number belonging to the UAV. In another embodiment, the UAV ID is a subscriber identifier, such as an IMSI (International Mobile Subscriber Identity). In the same way, the UAS Operator 102 may receive the UAV Controller ID from the mobile network operator, after completing a subscription. Note that the UAV and UAV controller do not need to have subscriptions with the same mobile network operator.

The procedure 500 begins with the UAS Operator 102 terminal launching an application to request flight authorization (see step 510). Here, the application discovers a UTM to communicate with, e.g. by performing a DNS query and receiving the IP address of a UTM. In the depicted embodiment, the application discovers the UTM-A 505.

In certain embodiments, the UAS Operator 102 performs a login procedure (see step 515). Via the login procedure, the UAS Operator 102 is authenticated by UTM-A 505.

The application (of the UAS Operator 102 terminal) sends the UAV flight authorization request 520 to UTM-A 505. The UTM-A 505 makes an authorization decision by considering the provided flight information (see step 525).

If UTM-A 505 decides to authorize the requested flight, then the UTM-A 505 creates a new flight authorization and sends a Store Flight Authorization message 530 to store it in the datastore 150. As depicted, the message 530 may include an Authorization Identity, the Operator ID, the UAV ID, the UAV Controller ID, the Flight Info, and Authorization Data. However, if the UTM-A 505 decides not to authorize the requested flight, then the UTM-A 505 may return a message indicating failure and the flight authorization is not granted If the datastore 150 is a Blockchain, then a mining procedure may be executed before the new flight authorization is stored in the Blockchain (see step 535). During this mining procedure a distributed consensus algorithm is executed, according to the Blockchain technology. After the mining procedure, the UTM-A receives a confirmation that the new flight authorization is securely stored in the Blockchain.

Upon storing the flight authorization information contained in the Store Flight Authorization message 530, the datastore 150 sends a response to the UTM-A 505 indicating success (see message 540). The UAS Operator 102 receives a flight authorization response from UTM-A (e.g., the application may inform the UAS operator).

In certain embodiments, the procedure 500 may require the UAS operator 102 to pay for a flight authorization. In such embodiments, the messages 520 and 530 may also request the transfer of some cryptocurrency tokens from the address of the UAS operator 102 (payer) to a destination address (payee). Here, the mining procedure (at step 535) may transfer the cryptocurrency tokens. If the transfer of the cryptocurrency tokens fails (e.g. because the UAS operator does not have enough cryptocurrency tokens), then the response message 540 may indicate the failure and the flight authorization is not granted.

Figure 6A:
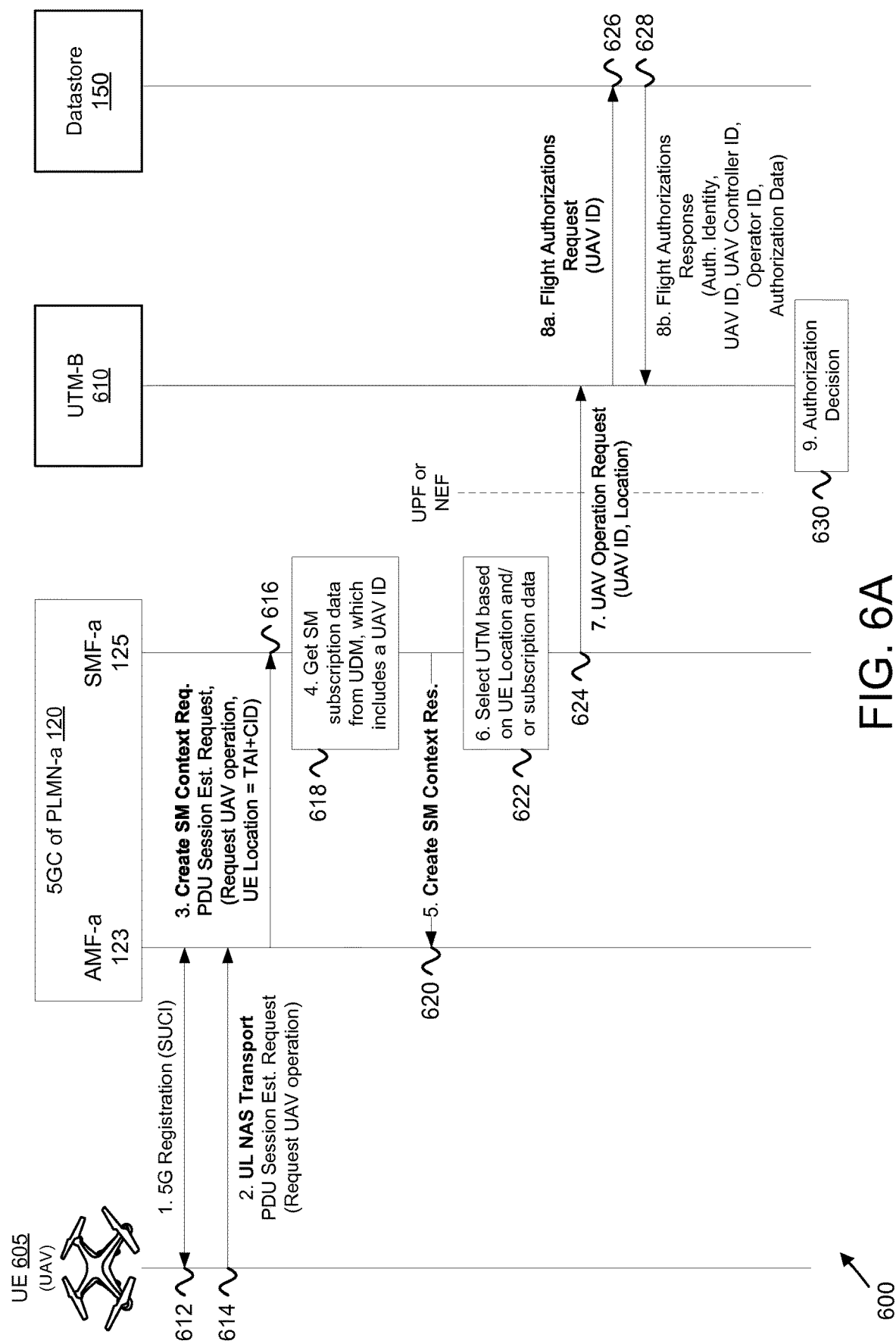
FIG. 6A is a diagram illustrating one embodiment of a procedure for establishing a data connection for UAV operation.
Figure 6B:
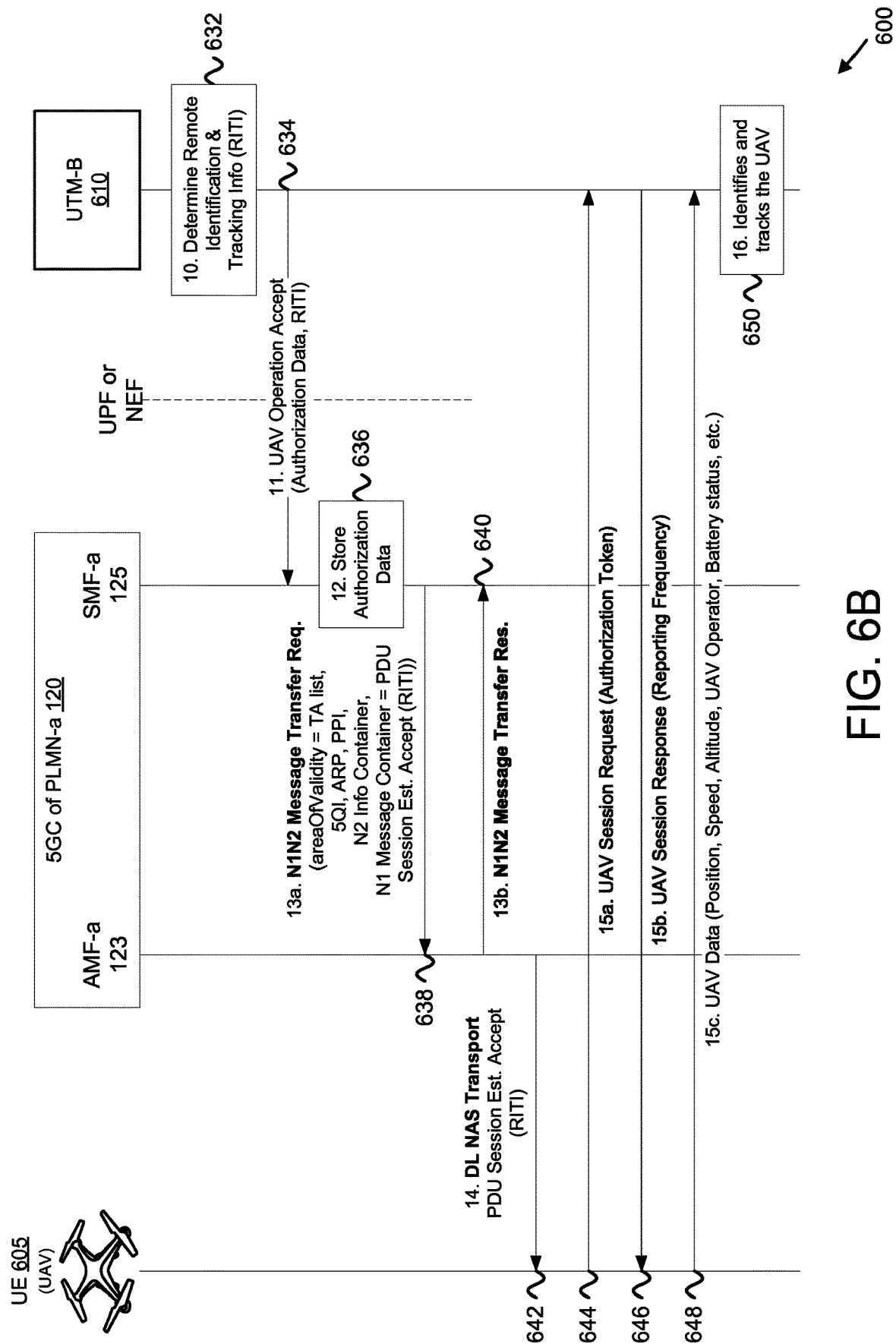
FIG. 6B is a continuation of the procedure of FIG. 6A.

FIGS. 6A-6B depict a procedure 600 for establishing a data connection for UAV operation of an access network, according to embodiments of the disclosure. After a flight authorization is granted and stored to the datastore, as shown in the previous clause, the UAV 103 and the UAV Controller 104 may request connectivity via their respect mobile communication networks (PLMNs). The procedure 600 involves at least a UE 605 (here, one embodiment of the UAV 103), a 5G core network (here, the first core network 120 comprising the AMF-a 123 and SMF-a 125), a UTM (here, the UTM-B 610), and the datastore 150. Note that between the UAV 103 and the AMF-a 123 there is an access network, such as an NG-RAN, a WLAN, a satellite access network, etc. However, for simplicity, this access network is not shown.

The procedure 600 is executed by the UAV 103 for establishing a data session in PLMN-a for UAV operation. Additionally, the same procedure 600 may be executed by the UAV Controller 104 for establishing a data session in PLMN-b for UAV operation. After the two data sessions are established, the UAV 103 is able to communicate with the UAV Controller 104 (even though they are using different PLMNs) and both of them should be able to communicate with one or more UTMs 141. Note that the procedure 600 addresses only the PDU Session establishment aspects of the UAV operation (e.g., at the control-plane).

The procedure 600 begins at Step 1 with the UE 605 (e.g., the UAV 103) registering with the first core network 120 by performing a normal, e.g., 5G, registration procedure (see messaging 612). Before the UAV 103 can initiate a flight operation, the UAV 103 needs to request a data session for UAV operation, e.g., via the first core network 120 of PLMN-a. For this purpose, at Step 2 the UE 605 (e.g., the UAV 103) sends an UL NAS Transport message containing a PDU Session Establishment Request message 614. Here, the PDU Session Establishment Request message 614 indicates that the PDU Session is required for UAV operation. This indication distinguishes the requested PDU Session from other PDU Sessions that may be requested by the UE 605, but which are not used for UAV operation (e.g., a PDU Session for firmware upgrade). In one embodiment, the "Request UAV operation" indication may be a specific Data Network Name ("DNN"). In another embodiment, the "Request UAV operation" indication is a new indication in the PDU Session Establishment Request message 614.

The AMF-a 123 receives the PDU Session Establishment Request message 614 and selects an SMF that is capable to support PDU Sessions for UAV operation. Here, the AMF-A 123 selects the SMF-a 125 in the first core network 120. At Step 3, the AMF-a 123 sends a Create SM Context Request message 616 to the selected SMF (SMF-a 125). Here, the Create SM Context Request message 616 contains the PDU Session Establishment Request. This message includes the "Request UAV operation" indication. The Create SM Context Request message 616 also includes the present mobile-specific location of the UAV. In certain embodiments, the present mobile-specific location comprises a present Tracking Area Identity (TAI) and Cell Identity (CID) of the UE 605 (e.g., the UAV 103). The "Request UAV operation" indicates to the SMF-a 125 that the requested PDU Session is needed in order to support UAV operations (e.g. in order to allow a UAV 103 to fly according to an authorized flight plan).

At Step 4, the SMF-a 125 obtains the SM subscription data of the UAV (see block 618), e.g., from a UDM. In various embodiments, the subscription data includes the UAV Identity ("UAV ID") of the UAV 103. This is the same UAV ID that was used to request a flight authorization, as discussed above with reference to FIG. 5. Note that where the UAV controller 104 is establishing the PDU Session for UAV operation, the subscription data may include the UAV Controller ID instead of (or in addition to) the UAV ID.

At Step 5, the SMF-a 125 creates a new SM context for the PDU Session requested by the UAV and sends a Create SM Context Response 620 to the AMF-a 123. Note that before the SMF-a 125 accepts the requested PDU Session for UAV operation, the SMF-a 125 needs to confirm that the UAV 103 is authorized to operate. For this purpose, at Step 6 the SMF-a 125 selects a UTM, e.g., based on the present location of the UAV 103 (e.g., UE 605) and/or based on the UAV subscription data (see block 622). In this example, the UTM-B 610 is selected.

At Step 7, the SMF-a 125 sends a UAV Operation Request message 624 to the UTM-B 610. In one embodiment, the UAV Operation Request message 624 is sent to the UTM-B 610 via a UPF, such as the UPF-A 121. In another embodiment, the UAV Operation Request message 624 is sent to the UTM-B 610 via a Network Exposure Function ("NEF"). In other embodiments, the UAV Operation Request message 624 may be sent to UTM-B 610 directly (e.g., using the U2 interface described above). Here, the UAV Operation Request message 624 includes the UAV ID.

In certain embodiments, the UAV Operation Request message 624 also includes a present location of the UAV. Note that because the UTM-B 610 may be located outside the PLMN-a, the present mobile-specific location may not be understood by the UTM-B 610. Thus, the SMF-a 125 may send the UTM-B 610 a geographical location of the UAV 103 (UE 605), such as coordinates from a satellite positioning system. In one embodiment, the SMF-a 125 maps the present mobile-specific location into the geographical location.

At Step 8, the UTM-B 610 sends a Flight Authorization Request 626 to the datastore 150 to retrieve all valid flight authorizations for the UE 605 (e.g., the UAV 103 or UAV Controller 104). As used herein, a "valid" flight authorization refers to an unexpired flight authorization stored in the datastore 150. The request 626 is only a lookup request and does not update or otherwise change the datastore 150. In case of a Blockchain, the request 626 is not broadcast to the Blockchain network and thus does not trigger a mining procedure. Rather, the request 626 is only served by the Blockchain node contacted by UTM-B 610, which performs a local lookup and returns all valid authorizations for the UE 605 found in the Blockchain (see message 628).

The Flight Authorization Response 628 sent to UTM-B 610 may include one or more valid flight authorizations for the UE 605, each one including an Authorization Identity, the associated UAV ID and UAV Controller ID, the Operator ID, and the Authorization Data. Here, the Authorization Data contains the airspace area where the UAV is authorized to operate. The Authorization Data may also include the time period when the UAV is authorized to operate.

Based on the received valid flight authorization for the UE 605, at Step 9 the UTM-B 610 performs an authorization decision and decides if the UAV can operate at its present location and time (see block 630).

Referring now to FIG. 6B, if the UTM-B decides that the UAV can operate, then at Step 10 the UTM-B 610 determines the Remote Identification & Tracking Information ("RITI"), which is to be used by the UAV 103 during its operation (see block 632). The RITI enables the UAV 103 to send to one or more UTMs its status information, referred to as "UAV data." In various embodiments, the UAV data includes the present position of the UAV 103, its UAV identity, its battery status, its mission type, its speed, its altitude, its operator identity, etc. In various embodiments, a UTM receiving the UAV data (e.g., UTM-B 610) applies the information for identifying the UAV 103, tracks its operational status and flight route, and performs collision avoidance with other UAVs flying at the same location.

In certain embodiments, the RITI includes a destination endpoint for sending the UAV data, referred to as a "data destination." In one embodiment, the data destination may be a uniform resource locator ("URL") to which the UAV data should posted. One example of a URL is "http://utm-b.operator.com/report". Here, the URL identifies a single UTM (the UTM-B 610 in this example). In another embodiment, the data destination may be a unicast IP address. Here, the data destination may also identify a protocol type and/or a port to which the UAV data should be sent. This unicast IP address also identifies a single UTM (e.g., the UTM-B 610). In other embodiments, the data destination may be a multicast IP address. Here, the data destination may also identify a protocol and a port to which the UAV data should be sent. This multicast IP address identifies a group of UTMs.

In certain embodiments, the RITI includes an Authorization Token, which is created by UTM-B 610 and is used later by the UE 605 to establish a "UAV session" with the UTM-B 610. The Authorization Token is a secret value that is sent to the UE 605. The Authorization Token identifies the UE 605 and the associated flight authorization. The Authorization Token is used by the UTM-B 610 to associate a "UAV session" with a specific UAV 103 and/or UAV controller 104. In certain embodiments, the RITI may also include a Reporting Frequency. Here, the Reporting Frequency is an indication of how often (e.g., how frequently) the UAV 103 is to send its UAV data to a UTM.

At Step 11, the UTM-B 610 sends a UAV Operation Accept response 634 to the SMF-a 125, either directly or via the UPF. Here, the UAV Operation Accept response 634 includes the RITI. The UAV Operation Accept response 634 may also include the Authorization Data (e.g. authorized area & time) received in step 8b (e.g., Flight Authorization Response message 628). If the UTM-B 610 does not authorize the UAV operation (in step 9), then the UTM-B 610 sends a UAV Operation Reject message to SMF-a 125 in place of the UAV Operation Accept response 634. Here, the UAV Operation Reject message may include a suitable Rejection Cause value expressing the reason why the requested UAV operation was rejected (e.g., no valid Authorization Data, wrong UAV location, wrong time, etc.).

If the Authorization Data is received in the UAV Operation Accept response 634, then at Step 12 the SMF-a 125 stores it and may subsequently use it to determine if the UAV 103 operates in compliance within this data, e.g. if it remains within the authorized area of operation (see block 636). In various embodiments, the SMF-a 125 may take actions when the UAV 103 is determined to operate outside the authorized airspace, or outside the authorized time period. After receiving the UAV Operation Accept response 634, the SMF-a 125 may also interact with the PCF, as normally, and receive Policy and Charging Control ("PCC") rules applicable to the PDU Session for UAV operation. As an example, these PCC rules may contain QoS information that should be applied by the radio access network 115 for establishing the resources needed to support the UAV operation.

At Step 13, the SMF-a 125 decides to accept the PDU Session requested by the UE 605 (e.g., the UAV 103) and sends an N1N2MessageTransfer Request message 638 to the AMF-a 123. Here, the N1N2MessageTransfer Request message 638 includes a PDU Session Establishment Accept message that contains the RITI received from UTM-B (e.g., in UAV Operation Accept response 634). The N1N2MessageTransfer Request message 638 may also include other parameters already defined in the 3GPP specifications, such as the areaOfValidity, a 5G QoS Indicator (5QI), an Admission/Retention Priority (ARP), a Paging Priority Indication (PPI) and an N2 Info Container that includes information for the radio access network 115 used to setup the appropriate radio access resources for the PDU Session. The AMF-a 123 sends a N1N2MessageTransfer Response message 640 back to the SMF-a 125 (e.g., acknowledging the N1N2MessageTransfer Request message 638).

At Step 14, the UE 605 receives a UL NAS Transport message containing a PDU Session Establishment Accept message 642 containing the RITI provided by UTM-B 610. At this point, the UE 605 has a PDU Session for UAV operation. As noted above, both the UAV 103 and the UAV controller 104 establish PDU Sessions for UAV operation. After both establish PDU Sessions for UAV operation, the UAV controller 104 connects to the UAV 103 and UAV operation may commence.

At Step 15, the UE 605 (e.g., the UAV 103) starts sending its UAV data to the UTM endpoint (here, UTM-B 610) identified by the received the RITI. In some embodiments, the UAV may establish a "UAV session" with the UTM identified by the RITI (i.e., the UTM-B 610 in this example) before sending its UAV data. Here, the UE 605 sends a UAV Session Request 644 to establish the UAV session. During the establishment of the "UAV session" (in steps 15a and 15b), the UAV presents the Authorization Token that was created by UTM-B 610 (see block 632) and was received by the UE 605 in the PDU Session Establishment Accept message 642. This Authorization Token identifies the UE 605 to the UTM-B 610 and associates the UAV 103 with a valid flight authorization.

The UTM-B 610 may respond to the UAV Session Request message 644 with a UAV Session Response message 646. In certain embodiments, the UAV Session Response message 646 may also include a Reporting Frequency. Here, the Reporting Frequency is an indication of how often (e.g., how frequently) the UE 605 is to send its UAV data to the UTM-B 610. Note that if the RITI includes the Reporting Frequency, then the UTM-B 610 does not include the Reporting Frequency in the UAV Session Response message 646.

At Step 15c, the UE 605 (e.g., the UAV 103) reports its current UAV data (position, speed, altitude, etc.) by sending a UAV Data Report message 648. Note that if no "UAV session" is established between the UE 605 and UTM-B 610 (i.e., steps 15a and 15b are not executed), then the UE 605 includes the Authorization Token in every UAV Data Report message in order to identify the UE 605 to the UTM-B 610. How often the UAV 103 sends a UAV Data Report message 648 is either pre-configured in the UAV 103, or it is specified by the received RITI, or it is specified in the UAV Session Response message 646.

The UTM-B 610 receives the UAV data provided by the UE 605 (e.g., the UAV 103). At Step 16, the UTM-B 610 identifies/tracks the UAV 103 using the UAV data (see block 650). In various embodiments, the UTM-B 610 may take actions when the UAV 103 is determined to operate outside the authorized airspace, or outside the authorized time period. The UE 605 continues to send UAV Data Reports 648 until UAV operation ceases.

Figure 7:
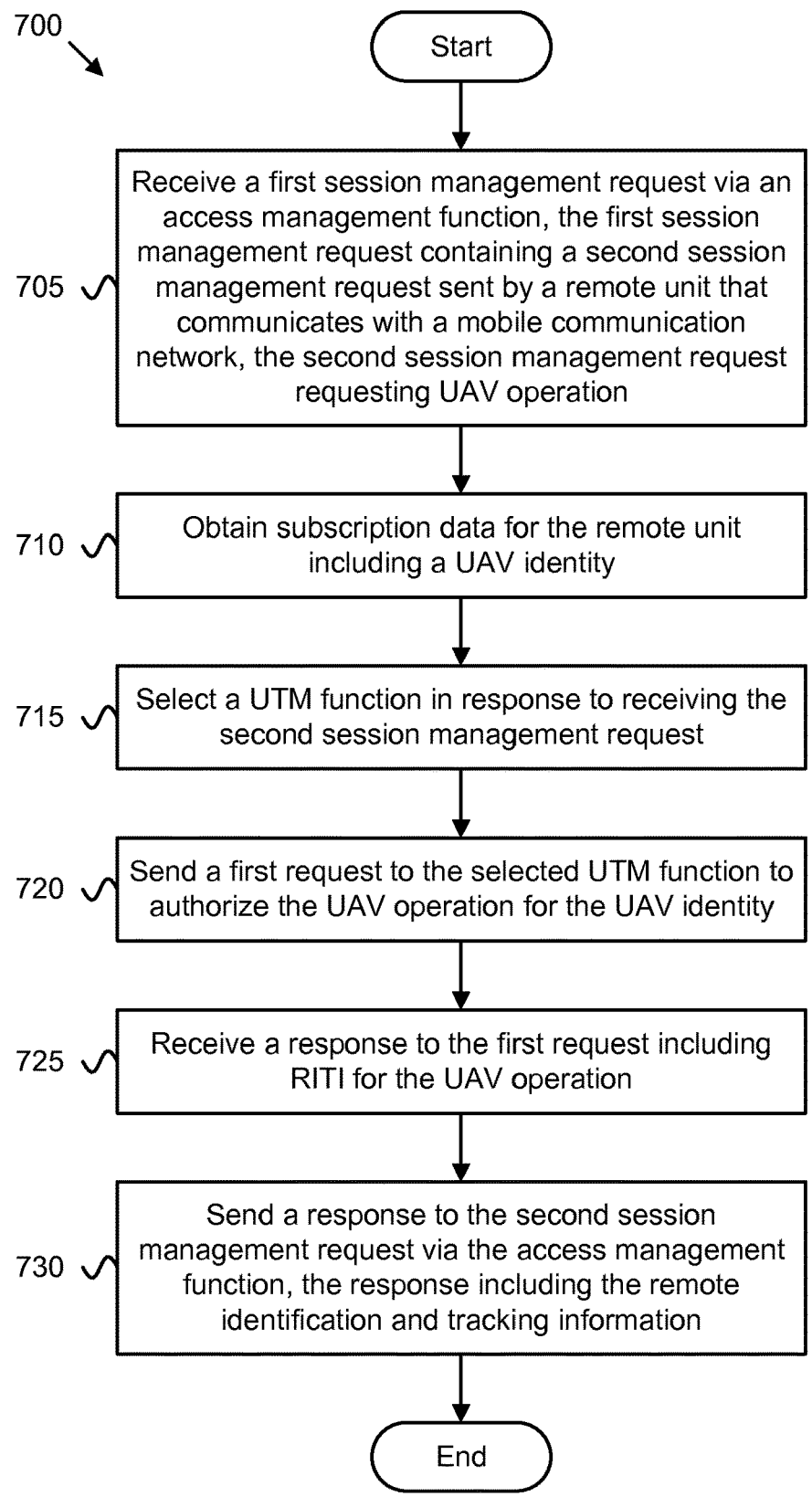
FIG. 7 is a flow chart diagram illustrating one embodiment of a first method for establishing a data connection for UAV operation.

FIG. 7 depicts a method 700 for establishing a data connection for UAV operation, according to embodiments of the disclosure. In some embodiments, the method 700 is performed by an apparatus, such as the SMF-a 125 and/or the SMF-b 135. In certain embodiments, the method 700 may be performed by a processor executing program code, for example, a microcontroller, a microprocessor, a CPU, a GPU, an auxiliary processing unit, a FPGA, or the like.

The method 700 begins and receives 705 a first session management request via an access management function. Here, the first session management request containing a second session management request sent by a remote unit that communicates with a mobile communication network, the second session management request requesting UAV operation. In various embodiments, the remote unit is a UE, such as the UAV 103 and/or the UAV controller 104.

The method 700 includes obtaining 710 subscription data for the remote unit including a UAV identity. The method 700 includes selecting 715 a UTM function in response to receiving the second session management request. The method 700 includes sending 720 a first request to the selected UTM function to authorize the UAV operation for the UAV identity.

The method 700 includes receiving 725 a response to the first request including RITI for the UAV operation. The method 700 includes sending 730 a response to the second session management request via the access management function, the response including the remote identification and tracking information. The method 700 ends.

Figure 8:
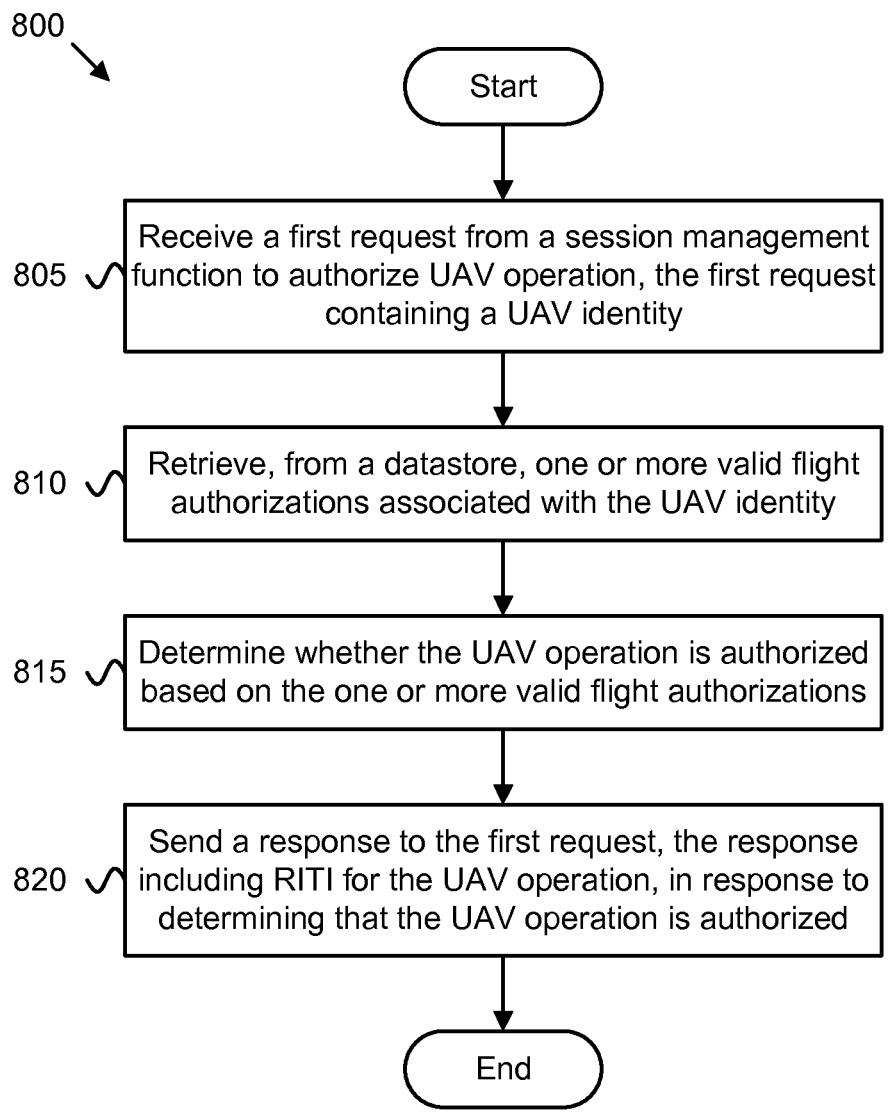
FIG. 8 is a block diagram illustrating another embodiment of a second method for establishing a data connection for UAV operation.

FIG. 8 depicts a method 800 for establishing a data connection for UAV operation, according to embodiments of the disclosure. In some embodiments, the method 800 is performed by an apparatus, such as the UTM 141, the UTM-A 505 and/or the UTM-B 610. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a first request from a session management function to authorize UAV operation. Here, the first request contains at least a UAV identity. The method 800 includes retrieving 810, from a datastore, one or more valid flight authorizations associated with the UAV identity. The method 800 includes determining 815 whether the UAV operation is authorized based on the one or more valid flight authorizations. The method 800 includes sending 820 a response to the first request, the response including RITI for the UAV operation, in response to determining that the UAV operation is authorized. The method 800 ends.

Figure 9:
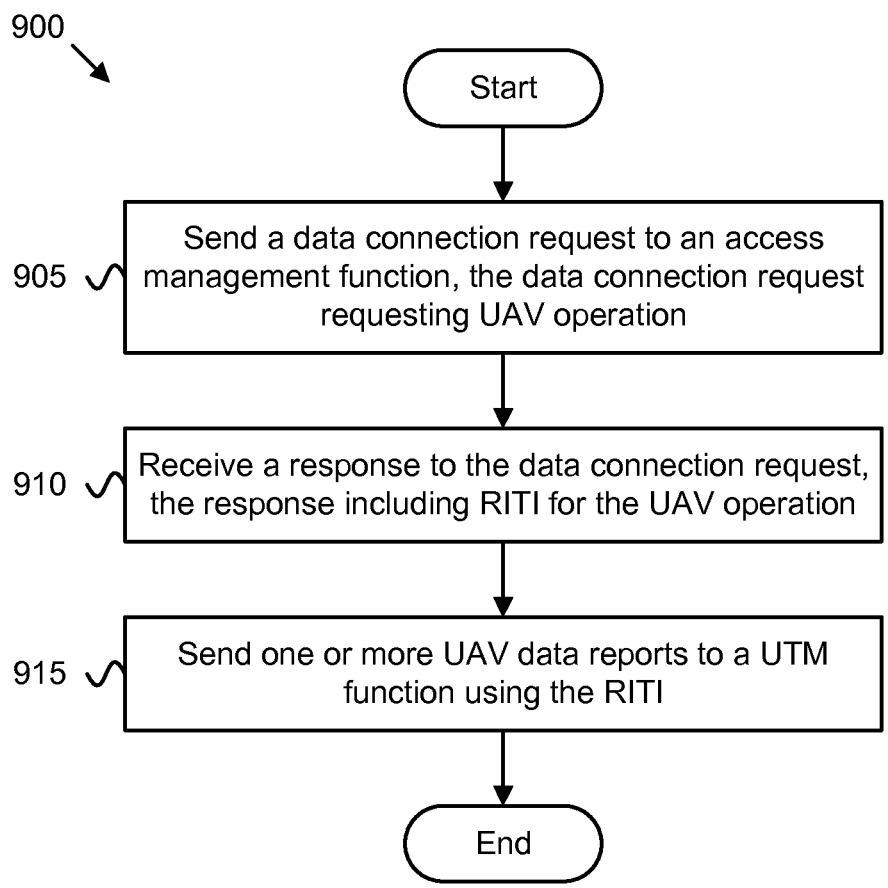
FIG. 9 is a flow chart diagram illustrating one embodiment of a third method for establishing a data connection for UAV operation.

FIG. 9 depicts a method 900 for establishing a data connection for UAV operation, according to embodiments of the disclosure. In some embodiments, the method 900 is performed by an apparatus, such as the UAV 103, the UAV Controller 104, and/or the UE 605. In certain embodiments, the method 900 may be performed by a processor executing program code, for example, a microcontroller, a microprocessor, a CPU, a GPU, an auxiliary processing unit, a FPGA, or the like.

The method 900 begins and sends 905 a data connection request to a session management function, the data connection request requesting UAV operation. The method 900 includes receiving 910 a response to the data connection request, the response including RITI for the UAV operation. The method 900 includes sending 915 one or more UAV data reports to a UTM function using the RITI. The method 900 ends.

Disclosed herein is a first apparatus for establishing a data connection for UAV operation. In various embodiments, the first apparatus is a SMF, such as the SMF-A 125 and/or SMF-b 135. The first apparatus includes a processor and a transceiver that communicates with one or more network functions in a mobile communication network and with one or more UTM functions. The processor receives (e.g., via the transceiver) a first session management request via an access management function. Here, the first session management request contains a second session management request sent by a remote unit that communicates with the mobile communication network, the second session management request requesting UAV operation. The processor obtains subscription data for the remote unit including a UAV identity. In response to receiving the second session management request, the processor selects a UTM function. The processor sends (e.g., via the transceiver) a first request to the selected UTM function to authorize the UAV operation for the UAV identity and receives (e.g., via the transceiver) a response to the first request including RITI for the UAV operation. The processor sends (e.g., via the transceiver) a response to the second session management request via the access management function, the response including the remote identification and tracking information.

In some embodiments of the first apparatus, the first session management request includes a location of the remote unit. In such embodiments, selecting the UTM function is based on one of: the location of the remote unit and the subscription data for the remote unit. In further embodiments, the first request may include the UAV identity and UAV position information derived from the location of the remote unit. In various embodiments, the remote unit is a UE, such as the UAV 103 and/or the UAV controller 104.

In some embodiments of the first apparatus, the response to the first request includes authorization data. Here, the authorization data comprising an authorized flight area. In various embodiments, the processor monitors the UAV operation for compliance with the authorization data.

In some embodiments of the first apparatus, the RITI comprises an authorization token, wherein the authorization token comprises a value that identifies the remote unit and associates the remote unit with a valid flight authorization. In some embodiments of the first apparatus, the RITI comprises a data destination, which comprises one of: a uniform resource locator, a multicast network address, and a unicast network address. In some embodiments of the first apparatus, the RITI comprises a UAV data reporting frequency. Here, the UAV data reporting frequency indicates an interval at which the remote unit is to send a UAV data report.

Disclosed herein is a first method for establishing a data connection for UAV operation. In various embodiments, the first method may be performed by a SMF, such as the SMF-a 125 and/or the SMF-b 135. The first method includes receiving a first session management request via an access management function. Here, the first session management request containing a second session management request sent by a remote unit that communicates with a mobile communication network, the second session management request requesting UAV operation. The first method includes obtaining subscription data for the remote unit including a UAV identity. The first method includes selecting a UTM function in response to receiving the second session management request. The first method includes sending a first request to the selected UTM function to authorize the UAV operation for the UAV identity. The first method includes receiving a response to the first request including RITI for the UAV operation. The first method includes sending a response to the second session management request via the access management function, the response including the remote identification and tracking information.

In some embodiments of the first method, the first session management request includes a location of the remote unit. In such embodiments, selecting the UTM function is based on one of: the location of the remote unit and the subscription data for the remote unit. In certain embodiments, the first request includes the UAV identity and UAV position information derived from the location of the remote unit. In various embodiments, the remote unit is a UE, such as the UAV 103 and/or the UAV controller 104.

In some embodiments of the first method, the response to the first request includes authorization data. Here, the authorization data comprises an authorized flight area. In such embodiments, the first may also include monitoring the UAV operation for compliance with the authorization data.

In some embodiments of the first method, the RITI comprises an authorization token, wherein the authorization token comprises a value that identifies the remote unit and associates the remote unit with a valid flight authorization. In some embodiments of the first method, the RITI comprises a data destination, which comprises one of: a uniform resource locator, a multicast network address, and a unicast network address. In some embodiments of the first method, the RITI comprises a UAV data reporting frequency, wherein the UAV data reporting frequency indicates an interval at which the remote unit is to send a UAV data report.

Disclosed herein is a second apparatus for establishing a data connection for UAV operation. In various embodiments, the second apparatus is a UTM, such as the UTM 141, the UTM-A 505 and/or the UTM-B 610. The second apparatus includes a processor and a transceiver that communicates with one or more network functions in a mobile communication network. The processor receives (e.g., via the transceiver) a first request from a session management function to authorize unmanned aerial vehicle ("UAV") operation, the first request containing a UAV identity. The processor retrieves, from a datastore, one or more valid flight authorizations associated with the UAV identity. The processor determines whether the UAV operation is authorized based on the one or more valid flight authorizations. In response to determining that the UAV operation is authorized, the processor sends (e.g., via the transceiver) a response to the first request. Here, the response includes remote identification and tracking information ("RITI") for the UAV operation.

In some embodiments of the second apparatus, the RITI comprises an authorization token, wherein the authorization token comprises a value that identifies the remote unit and associates the remote unit with a valid flight authorization. In some embodiments of the second apparatus, the RITI comprises a data destination, which comprises one of: a uniform resource locator, a multicast network address, and a unicast network address of the apparatus. In various embodiments, the remote unit is a UE, such as the UAV 103 and/or the UAV controller 104.

In some embodiments of the second apparatus, the RITI comprises a UAV data reporting frequency, wherein the UAV data reporting frequency indicates an interval at which the remote unit is to send a UAV data report. In some embodiments of the second apparatus, the transceiver further receives a UAV session request from the remote unit, the UAV session request containing an authorization token, wherein the processor establishes the requested UAV session in response to validating the authorization token and tracks the remote unit using the UAV data received via the established UAV session.

In some embodiments of the second apparatus, the transceiver further receives UAV data from the remote unit, the UAV data containing an authorization token, wherein the processor tracks the remote unit using the received UAV data. In some embodiments of the second apparatus, the datastore comprises a blockchain network. In some embodiments of the second apparatus, the response to the first request includes authorization data comprising an authorized flight area, wherein the session management function monitors the UAV operation for compliance with the authorization data.

Disclosed herein is a second method for establishing a data connection for UAV operation. In various embodiments, the third method may be implemented by a UTM, such as the UTM 141, the UTM-A 505 and/or the UTM-B 610. The second method includes receiving a first request from a session management function to authorize UAV operation, the first request containing a UAV identity. The second method includes retrieving, from a datastore, one or more valid flight authorizations associated with the UAV identity. The second method includes determining whether the UAV operation is authorized based on the one or more valid flight authorizations. The second method includes sending a response to the first request, the response including RITI for the UAV operation, in response to determining that the UAV operation is authorized.

In some embodiments of the second method, the RITI comprises an authorization token, wherein the authorization token comprises a value that identifies the remote unit and associates the remote unit with a valid flight authorization. In some embodiments of the second method, the RITI comprises a data destination, which comprises one of: a uniform resource locator, a multicast network address, and a unicast network address of the apparatus. In various embodiments, the remote unit is a UE, such as the UAV 103 and/or the UAV controller 104.

In some embodiments of the second method, the RITI comprises a UAV data reporting frequency, wherein the UAV data reporting frequency indicates an interval at which the remote unit is to send a UAV data report. In certain embodiments, the second method includes receiving a UAV session request from the remote unit and establishing the requested UAV session in response to validating an authorization token. Here, the UAV session request contains the authorization token. The second method may further include tracking the remote unit using the UAV data received via the established UAV session.

In certain embodiments, the second method includes receiving UAV data from the remote unit. Here, the UAV data contains an authorization token. The second method may further include tracking the remote unit using the received UAV data. In some embodiments of the second method, the datastore comprises a blockchain network. In some embodiments of the second method, the response to the first request includes authorization data comprising an authorized flight area, wherein the session management function monitors the UAV operation for compliance with the authorization data.

Disclosed herein is a third apparatus for establishing a data connection for UAV operation. In various embodiments, the third apparatus is a UE, such as the UAV 103, the UAV Controller 104, and/or the UE 605. The third apparatus includes a processor and a transceiver that communicates with a mobile communication network via an access network. Here, the processor sends (e.g., via the transceiver) a data connection request to a session management function, the data connection request requesting unmanned aerial vehicle ("UAV") operation. The processor receives (e.g., via the transceiver) a response to the data connection request. Here, the response includes remote identification and tracking information ("RITI") for the UAV operation. The processor further sends (e.g., via the transceiver) one or more UAV data reports to a UAV Traffic Management ("UTM") function using the RITI.

In some embodiments of the third apparatus, the RITI includes reporting frequency information, wherein the one or more UAV data reports are sent according to the reporting frequency information. In some embodiments of the third apparatus, the RITI comprises an authorization token, wherein the authorization token comprises a value that identifies the apparatus to a UTM function and associates the apparatus with a valid flight authorization. In some embodiments of the third apparatus, the RITI comprises a data destination, which comprises one of: a uniform resource locator, a multicast network address, and a unicast network address of the apparatus.

In some embodiments of the third apparatus, the RITI includes an authorization token. In such embodiments, the transceiver further sends a UAV session request containing the authorization token to the UTM function. Here, sending the one or more UAV data reports occurs in response to establishing the UAV session with the UTM function.

In some embodiments of the third apparatus, the RITI includes an authorization token, wherein the one or more UAV data reports include the authorization token. In some embodiments of the third apparatus, the response to the data connection request includes reporting frequency information, wherein the one or more UAV data reports are sent according to the reporting frequency information.

Disclosed herein is a third method for establishing a data connection for UAV operation. In various embodiments, the third method may be implemented by a UE, such as the UAV 103, the UAV Controller 104, and/or the UE 605. The third method includes sending a data connection request to a session management function, the data connection request requesting UAV operation. The third method includes receiving a response to the data connection request, the response including RITI for the UAV operation. The third method includes sending one or more UAV data reports to a UTM function using the RITI.

In some embodiments of the third method, the RITI includes reporting frequency information, wherein the one or more UAV data reports are sent according to the reporting frequency information. In some embodiments of the third method, the RITI comprises an authorization token, wherein the authorization token comprises a value that identifies the apparatus to a UTM function and associates the apparatus with a valid flight authorization. In some embodiments of the third method, the RITI comprises a data destination, which comprises one of: a uniform resource locator, a multicast network address, and a unicast network address of the apparatus.

In some embodiments of the third method, the RITI includes an authorization token. In such embodiments, the third method may also include sending a UAV session request containing the authorization token to the UTM function. Here, sending the one or more UAV data reports occurs in response to establishing the UAV session with the UTM function.

In some embodiments of the third method, the RITI includes an authorization token, wherein the one or more UAV data reports include the authorization token. In some embodiments of the third method, the response to the data connection request includes reporting frequency information, wherein the one or more UAV data reports are sent according to the reporting frequency information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A session management function ("SMF") configured to:
   receive a first session management request via an access management function ("AMF"), wherein the first session management request contains a second session management request associated with a user equipment ("UE"), and wherein the second session management request is for unmanned aerial vehicle ("UAV") operation;
   obtain subscription data for the UE including a UAV identity;
   select an unmanned aerial vehicle traffic management ("UTM") function based, at least in part, on the second session management request;
   transmit a first request to the selected UTM function to authorize the UAV operation for the UAV identity;
   receive a response to the first request including remote identification and tracking information ("RITI") for the UAV operation, wherein the RITI comprises an authorization token for establishing a UAV session between the UE and a UTM function; and
   transmit a response to the second session management request via the AMF, the response including the RITI.

2. The SMF of claim 1, wherein the first session management request includes a location of the UE.

3. The SMF of claim 2, wherein the UTM function is selected based on one of: the location of the UE or the subscription data for the UE.

4. The SMF of claim 2, wherein the first request includes the UAV identity and UAV position information.

5. The SMF of claim 1, wherein the response to the first request includes authorization data, the authorization data comprising an authorized flight area, wherein the SMF is configured to monitor the UAV operation for compliance with the authorization data.

6. The SMF of claim 1, wherein the authorization token identifies the UE and associates the UE with a valid flight authorization.

7. The SMF of claim 1, wherein the RITI comprises a data destination, which comprises one of: a uniform resource locator, a multicast network address, or a unicast network address.

8. The SMF of claim 1, wherein the RITI comprises a UAV data reporting frequency, wherein the UAV data reporting frequency indicates an interval at which the UE is to transmit a UAV data report.

9. A method performed by a session management function ("SMF"), the method comprising:
   receiving a first session management request via an access management function ("AMF"), wherein the first session management request contains a second session management request associated with a user equipment ("UE"), and wherein the second session management request is for unmanned aerial vehicle ("UAV") operation;
   obtaining subscription data for the UE including a UAV identity;
   selecting an unmanned aerial vehicle traffic management ("UTM") function in response to receiving the second session management request;
   transmitting a first request to the selected UTM function to authorize the UAV operation for the UAV identity;
   receiving a response to the first request including remote identification and tracking information ("RITI") for the UAV operation, wherein the RITI comprises an authorization token for establishing a UAV session between the UE and a UTM function; and
   transmitting a response to the second session management request via the AMF, the response including the RITI.

10. The method of claim 9, wherein the authorization token identifies the UE and associates the UE with a valid flight authorization.

11. The method of claim 9, wherein the RITI comprises a data destination, which comprises one of: a uniform resource locator, a multicast network address, and a unicast network address.

12. The method of claim 9, wherein the RITI comprises a UAV data reporting frequency, wherein the UAV data reporting frequency indicates an interval at which the UE is to transmit a UAV data report.

13. An unmanned aerial vehicle traffic management ("UTM") configured to:
   receive a first request from a session management function ("SMF") to authorize unmanned aerial vehicle ("UAV") operation, the first request containing a UAV identity;
   retrieve, from a datastore, one or more valid flight authorizations associated with the UAV identity;
   determine whether the UAV operation is authorized based on the one or more valid flight authorizations;
   transmit a response to the first request, the response including remote identification and tracking information ("RITI") for the UAV operation, based, at least in part, on determining that the UAV operation is authorized, wherein the RITI comprises an authorization token for establishing a UAV session between a user equipment ("UE") and a UTM function.

14. The UTM of claim 13, wherein the authorization token identifies the UE and associates the UE with a valid flight authorization.

15. The UTM of claim 13, wherein the RITI comprises a data destination, which comprises one of: a uniform resource locator, a multicast network address, and a unicast network address of the UTM.

16. The UTM of claim 13, wherein the RITI comprises a UAV data reporting frequency, wherein the UAV data reporting frequency indicates an interval at which the UE is to transmit a UAV data report.

17. The UTM of claim 13, wherein the UTM is further configured to receive a UAV session request from the UE, the UAV session request containing an authorization token, wherein the UTM is further configured to establish the requested UAV session in response to validating the authorization token and tracks the UE using UAV data received via the established UAV session.

18. The UTM of claim 13, wherein the UTM is further configured to receive UAV data from the UE, the UAV data containing an authorization token, wherein the UTM is further configured to track the UE using the received UAV data.

19. The UTM of claim 13, wherein the datastore comprises a blockchain network.

20. The UTM of claim 13, wherein the response to the first request includes authorization data comprising an authorized flight area associated with the UAV operation.

* * * * *